INVENTORS
IRVING M. ABRAMS
RICHARD C. KNUPP
CLIFFORD J. LEWIS

United States Patent Office 3,573,004
Patented Mar. 30, 1971

3,573,004
COUNTERCURRENT LIQUID-SOLIDS CONTACT PROCESS
Irving M. Abrams, Redwood City, Calif., and Richard C. Knupp, Boulder, and Clifford J. Lewis, Wheatridge, Colo., assignors to Diamond Shamrock Corporation, Cleveland, Ohio
Original application Apr. 29, 1964, Ser. No. 363,390. Divided and this application June 20, 1967, Ser. No. 663,465
Int. Cl. B01d 11/02, 15/04
U.S. Cl. 23—312
4 Claims

ABSTRACT OF THE DISCLOSURE

A method is provided for the continuous countercurrent contact of a solid, such as an ion-exchange resin, with a liquid wherein the liquid is contacted stepwise with an increasingly fresh resin thereby insuring maximum ion-exchange efficiency.

---

This is a division of application Ser. No. 363,390, filed Apr. 29, 1964, now abandoned.

This invention relates to systems for solid-liquid contact, and more particularly to a new and improved apparatus and process for transporting settleable solids at controllable rates in a liquid medium in which solids and liquid are in continuous countercurrent flow.

There are many systems known to the art and extensively used commercially for both concurrent and countercurrent contact of liquids and solids. For example, many ores and mineral concentrates are scrubbed on sand screws which transport the solid materials upward while incoming water is allowed to flow downward under the upward-moving solids. Also, many substances, particularly ores or mineral concentrates, are treated with chemical leaching agents, such as sulfuric acid or aqueous sodium carbonate, by using a series of leaching vats and the requisite pumps or gravity flow procedures so that fresh reagent moves countercurrent to the movement of the solids. Further, there are many combinations of drag and rake classifiers, thickeners, filters, pumps, and gravity flow devices which permit the continuous movement of solid and liquid phases in contact with each other. However, the products obtained by the use of such systems are either enriched concentrates of the original solids or solutions enriched by a substance dissolved away from the solids.

Although the present invention will be described principally in terms of its application to systems containing particulate ion exchange resins, it is not limited to such systems. Other systems in which the invention may be used involve solids such as active carbon, clays and sorbants. The invention is of general applicability in liquid-solid contact operations when it is desired to prevent loss of solids from the system.

The technology of utilizing ion exchange resins is well understood by those skilled in the art. Previously, the particulate ion exchange resin has been retained in perforated containers which continuously contact a solution or a slurry containing the desired metal ions and/or finely divided solids, this contact being in such a manner that the desired metal or metals are adsorbed by the resin while the spent liquid is discharged to waste or subjected to further processing. Subsequently, the exhausted resin is eluted and/or regenerated by well-known chemical techniques, while being retained in the perforated baskets. Alternatively, the resin may be loaded into beds or columns and treated with a solution containing the desired values in the form of ions in order to achieve the desired ionic state, this operation being followed by the usual elution and/or ion exchange resin regeneration procedures.

Many attempts have been made to develop a system in which the solid resin and aqueous solution can intermingle continuously in such a manner that the spent solution can be discharged and the exhausted resin eluted and regenerated while fresh solution continuously enters the system and no appreciable amount of solid resin leaves the system. In other words, while there have been attempts to achieve a practicable completely hydraulic system involving both a liquid and a solid, these attempts have not been completely successful.

An illustration of a completely hydraulic ion exchange system is provided by the liquid ion exchange process commonly used in the uranium milling industry. In this process, a water-insoluble, kerosene-miscible organic ion exchange reagent is dissolved in kerosene to produce a liquid organic extractant. This extractant is then intimately mixed with a uranium-pregnant aqueous feed solution. During the contact of the two solutions, the uranium values are transferred to the organic phase. The two phases are then allowed to separate under quiescent conditions by virtue of their immiscibility. The now uranium-barren aqueous phase is discarded or sent to further processing for other than uranium values. The uranium-pregnant organic phase is contacted with an aqueous stripping reagent under the same conditions of mixing and quiescent settling as were used during the extraction operation. The composition of the aqueous stripping reagent is such that the chemistry of uranium loading is reversed and the uranium enters the aqueous stripping phase; this operation simultaneously regenerates the organic extractant which is recycled to the extraction operation. By controlling the relative volume of uranium-pregnant feed solution and aqueous stripping reagent while the volume of recycling organic phase remains constant, it is possible to achieve uranium concentration factors of about 50 to 100. Other metals may also be processed by this completely hydraulic liquid ion exchange method; these metals include vanadium, tungsten, niobium, and tantalum.

In the liquid ion exchange process, often termed a "LIX" process, described hereinabove, the organic phase floats on top of the aqueous phase. Thus, the aqueous phase may be continuously withdrawn from the bottom of a settling chamber relatively free of the organic phase, and discharged into a next mixing and phase separation chamber. If, however, a solid ion exchange resin is substituted for the liquid organic extractant, it must sharply settle or sharply float away from the aqueous phase in order that an efficient separation of liquid and solid can be realized. However, it is obvious that a flow of the aqueous phase is necessary to transport the resin hydraulically either from the top of the settling chamber, or from the bottom, so that it is never practically possible to obtain a sharp separation of the aqueous phase from the solid phase.

The advantages of the liquid ion exchange process for the purification and concentration of metals do not result from any general chemical superiority of the liquid extractants as compared with solid ion exchange resins, but rather from the completely hydraulic nature of the liquid ion exchange system and the ease of phase separation. These advantages include continuous flow of metal-pregnant solution and organic extractant, rapid reaction rates and low reagent inventory because of the complete dispersion of extractant, and minimized operating labor requirements because of the simplicity of the hydraulic system. On the other hand, the use of solid ion exchange resins in place of liquid organic extractants would have pronounced advantages if a completely hydraulic system were developed wherein sharp solid-liquid separation were possible. These advantages would include the fact that the ion exchange resin does not impart a taste or odor to the metal-barren aqueous phase; this is particularly significant when the aqueous phase drains into public waters. Also, an ion exchange resin is much less soluble in water than is a liquid organic extractant, making it economically feasible to use the resin for the treatment of extremely dilute solutions whose metal content is not high enough for any loss of the ion exchange material to be tolerated. Even more important is the fact that a solid ion exchange resin can be used "as is," in contrast with the liquid reagent which must be dispersed in a hydrocarbon, such as kerosene. The importance of these advantages as well as other advantages of the solid-state resin will be obvious to those skilled in the art.

A principal object of this invention, therefore, is to provide an improved apparatus and process for the continuous countercurrent contact of solids and liquids.

A further object is to provide an improved apparatus and process for solids-liquid countercurrent flow whereby a solid phase may be continuously recycled while fresh liquid is continuously introduced and treated liquid is continuously withdrawn.

A further object of the invention is to provide an improved apparatus and process whereby controllable liquid-solid contact in a continuous-countercurrent flow is effected in a hydraulic system.

A still further object of the invention is to provide such an apparatus and process wherein the liquid and solid phases may be sharply separated during continuous flow.

Still another object of the invention is to provide a multi-stage apparatus and process for continuous countercurrent solid-liquid contact which are adaptable to a variety of applications in the field of ion exchange.

Broadly, the apparatus of the present invention for continuous countercurrent contact of liquid and solids comprises, in combination, at least one, generally a plurality, typically about 3 to 10, mixing-settling cell units, each comprising a mixing chamber containing an agitator wherein liquid and solids are agitated and from which the liquid-solid mixture is discharged into a settling chamber having two outlets, one adapted to discharge contained liquid and a second outlet at the bottom adapted to discharge settled solids therethrough. Thus it will be appreciated that the mixing-settling cell unit is provided with (1) inlet and first outlet means for transfer of liquid therethrough and (2) a second outlet for discharge of solids, and at least one, preferably one for each cell unit, bypass conduit adapted to receive solids from the lower portion of a settling unit of one cell unit, e.g., the said outlet for discharge of solids, and liquid discharge from an upstream cell unit, control means, comprising a photoconductive cell and a by pass conduit control valve regulating fluid flow and means, preferably an air lift circuit, for conveying solids from the said bypass conduit upstream countercurrent to the movement of liquid through the apparatus.

Figure 1:
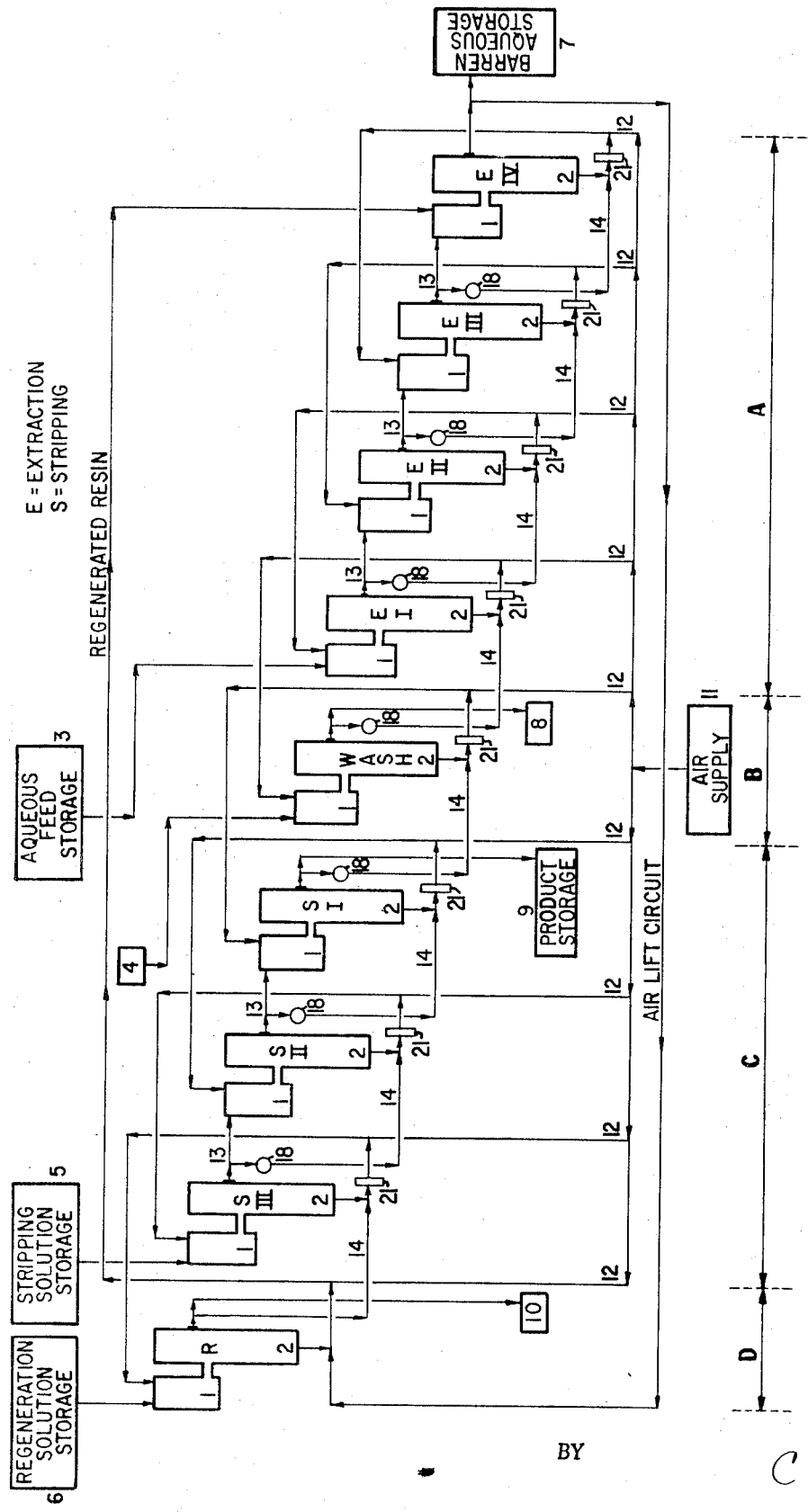
FIG. 1 illustrates schematically apparatus of the present invention as used in the recovery of values from an aqueous solution by ion exchange.

Referring more particularly to the drawings, as shown in FIG. 1, as adapted for solid state ion exchange processing the apparatus of this invention, typically formed of glass, includes a series of mixing-settling cells, each of which comprises a mixing chamber 1 and a settling chamber 2. The number of cells in the apparatus may be varied according to the system and the number of mixing-settling steps required. In the embodiment shown in FIG. 1, the liquid to be treated is contacted with a solid ion exchange resin in the portion of the unit indicated by A, i.e., the extraction section; the exhausted ion exchange resin is washed with water in the portion indicated at B and stripped of the desired values by elution in the portion marked C, i.e., the stripping section. The ion exchange resin is regenerated in the extreme left-hand cell (marked D) before being recycled to the treating stage.

Storage vessels, denoted at 3, 4, 5 and 6, contain liquids to be fed to the system, and vessels 7, 8, 9 and 10, respectively, receive the corresponding liquids after they have passed through the system. The number, position and purpose of these vessels will depend on the purpose for which the apparatus is to be used. In the embodiment shown in FIG. 1, vessels 3, 4, 5 and 6, respectively, contain liquid to be treated, wash liquid, eluting solution and regenerant solution. A compressed air supply 11 (from a source not shown) furnishes air pressure through conduits 12 for transporting the solid phase from unit to unit; the cells are connected by means of conduits 13 and bypass conduits 14.

Figure 2:
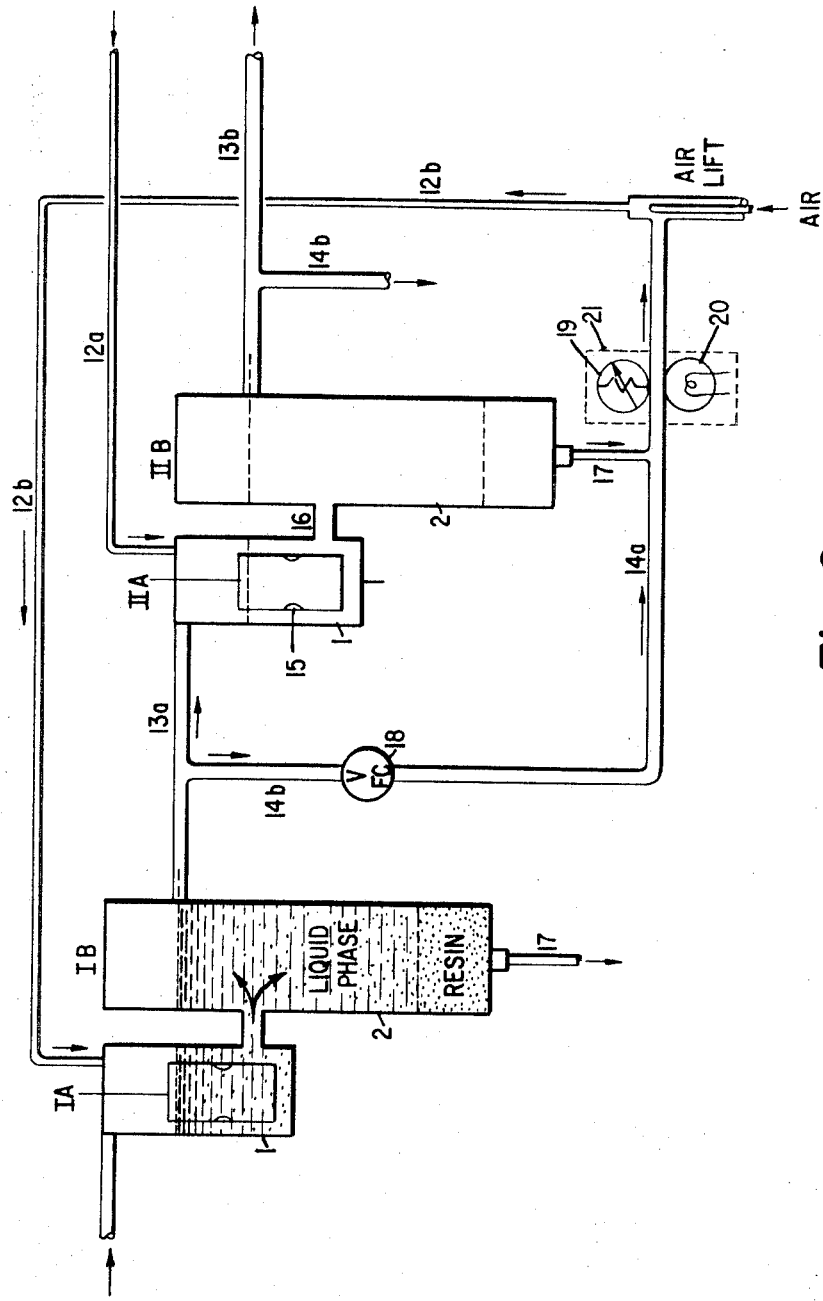
FIG. 2 is a detailed schematic enlargement of a part of the apparatus of FIG. 1 illustrating flow control features.

Referring now to FIG. 2, the construction of a single mixing-settling cell unit as illustrated in FIG. 1 will be described in more detail. As there shown, referring to the cell unit comprising units IIA and IIB, mixing chamber 1 is fed by air conduit 12 adapted to introduce solids thereinto and liquid phase conduit 13a, and is provided with an agitator 15 as, for example, an air driver stirrer or other type of agitator. Passage 16 connects the mixing chamber 1 with settling chamber 2. The settling chamber discharges near its top into a liquid phase conduit 13b which branches into a conduit 14b and at the bottom is adapted to discharge solids into conduit 17; the latter connects with bypass conduit 14a from a preceding, or upstream, cell unit IB and IA. A control valve 18, positioned in bypass conduit 14b upstream from the opening of resin conduit 17, permits control in response to flow conditions as monitored by a control unit designated generally at 21 and comprising a light-sensitive device 19, such as a photoelectric cell, typically a cell employing a cadmium sulfide (CdS) sensitive material, located in the bypass between conduit 17 and air conduit 12b. A light source 20 or other source of radiation energy (not shown) is located in suitable position to direct a beam of light across bypass 14a toward the light-sensitive device 19. Although it is desirable for bypass conduit 14a to be constructed of glass or other transparent material, at least at this point, transparency is not mandatory; for example, the light-sensitive device and light source may be placed entirely within or through a non-transparent bypass across from each other or other radiant energy control means can be used.

Referring to both of the cell units shown in FIG. 2, in operation, the general flow of liquid in the apparatus of FIGS. 1 and 2 is from left to right and the movement of the solid phase is from right to left. Liquid and solids (the latter carried by a current of air from air supply 11) are introduced into mixing chamber 1 through conduits 13a and 12a respectively. After thoroughly mixing by means of the agitator 15 they pass together through passage 16 into settling chamber 2. The solid phase settles to the bottom of the chamber, while the supernatant liquid phase is discharged into conduit 13b and bypass 14b.

Bypass 14b, between valve 18 and air conduit 12b, is filled with liquid from the previous or upstream cell which acts as a hydraulic plug to prevent the discharge of liquid from settling chamber 2 into the bypass system. By controlling the liquid flow rate through the bypass, a point of hydraulic balance may be attained whereby resin only is discharged through conduit 17. The resin thus discharged is transported by means of the bypass liquid to air conduit 12b, where it is carried by a current of air from air supply 11 into the mixing chamber of the previous or upstream cell. At the proper point of hydraulic balance, a discharge containing a maximum of solids and a minimum of entrained liquid is achieved. The advantage of the aqueous phase bypass system described hereinabove is in the utilization as the transfer medium of liquid from the same cell to which the resin is being moved, whereby a proper quality balance is maintained between units in the system.

It will be apparent that too great a liquid flow through bypass 14a will result in an undesirable upward flow of liquid through conduit 17 into the settling chamber. On the other hand, if the flow through the bypass is insufficient, an excessive quantity of solid and liquid is discharged from the settling chamber. The proper hydraulic balance is obtained by means of control valve 18, operated in response to a control means 21, preferably a light-sensitive device 19 and light source 20. The valve 18 desirably is made responsive to resistance changes in the circuit of the light-sensitive device, which changes are induced by variations in light reception of the same due to variable light transmittance by the solid-liquid mixture in the bypass. Thus, a decrease in liquid flow through the bypass conduit will cause excess resin to discharge, resulting in a decrease in light transmittance to the photocell; this will cause the valve 18 to open wider and permit more liquid to pass until the equilibrium is again reached. The opposite result will obtain if the bypass liquid flow should exceed requirements.

It also will be appreciated that the control valve 18 can, if desired, be a manual control valve operated as necessary after observing the electrical current characteristics of the photoelectric cell unit.

It has been discovered that the apparatus of this invention may advantageously be used for removing copper values from acidic waste streams such as mine waters. This may be accomplished by adjusting the pH of the solution to between about 3 and 8, and contacting it with a weak-base or intermediate-base anion exchange resin containing amine groups, preferably (but not necessarily) in the acid form. The copper in the solution apparently forms amine complexes with amino groups on the resin. Upon treatment of the exhausted resin with dilute mineral acid, the copper is eluted and may be recovered.

This method for the recovery of copper values is illustrated in the following examples wherein a simulated mine drainage solution is treated with an intermediate-base anion exchange resin containing primary, secondary and tertiary amine and quaternary ammonium groups (Duolite A–30G, manufactured by Diamond Alkali Co.) in the acid form. The particle size of the resin is 60–100 mesh (Tyler Standard Sieve Series). The photoconductive cell used is a Clairex Cell No. CL 602 manufactured by the Clairex Corporation of New York city and having the following specifications:

Sensitive materials: Cadmium sulphide (CdS)
Enclosure (inches): 0.25 x 0.5
Peak spectral response (angstroms): 5150
Light resistance (average DC resistance measured at 2 foot candles, 2854° K. and 25° C. ambient): 1 megohm
Voltage rating (max.): 300
Power (milliwatts): 75

Figure 3:
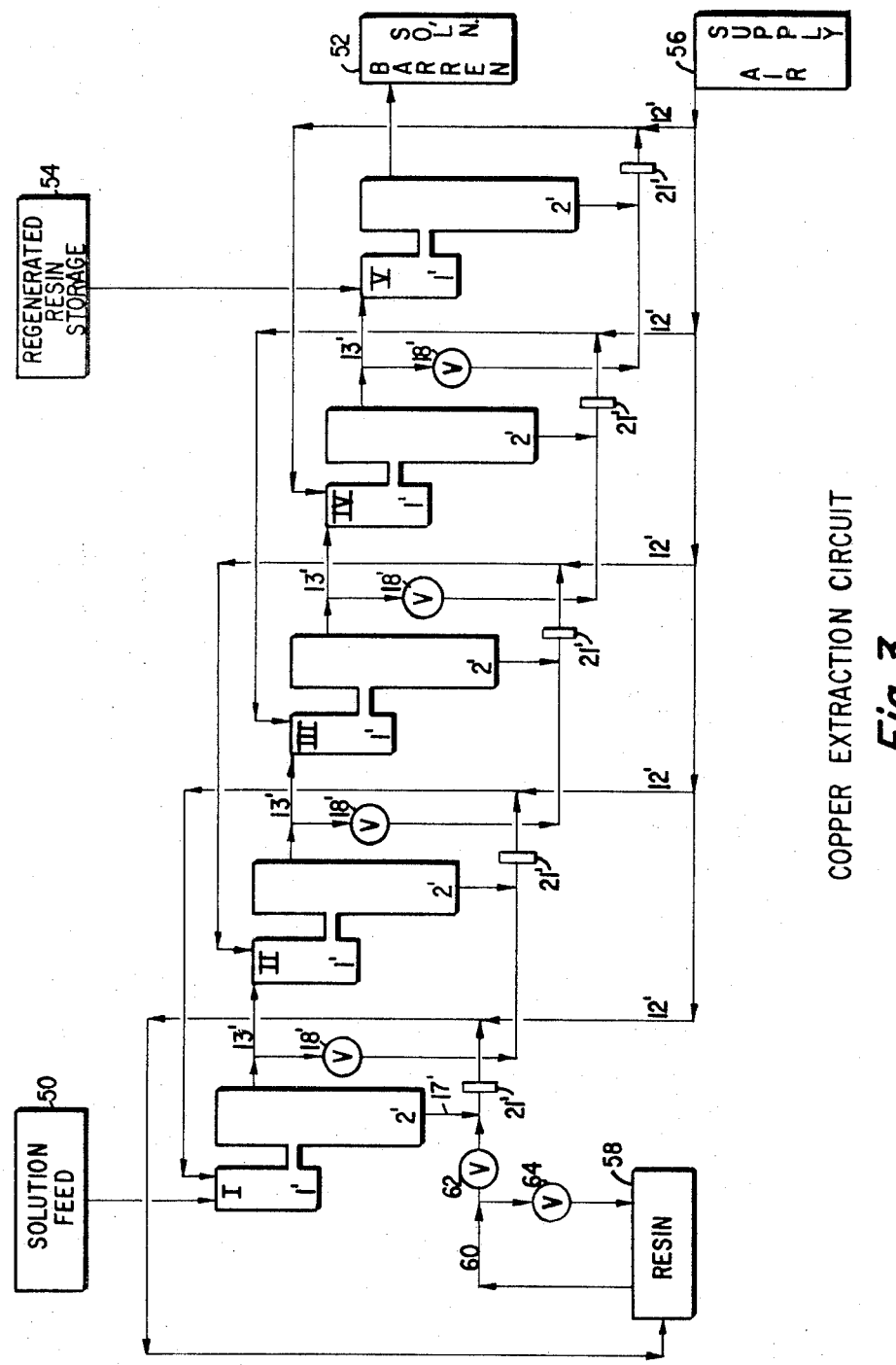
FIG. 3 is a schematic embodiment of the apparatus of this invention for use in the recovery of copper values from copper-containing mine waters.

As shown in FIG. 3, the apparatus used consists of five cell units (numbered—left to right—in the following examples by Roman numerals from I through V, respectively), a solution feed vessel 50 and barren solution vessel 52, a storage tank 54 for regenerated ion exchange resin, an air supply 56, typically providing a pressure of 1–10 p.s.i.g., and a vessel 58 for receiving exhausted and copper-loaded resin and for containing wash liquid to be fed to the bypass 60 of the first cell in the series. The construction of the individual cells is identical with that shown in FIG. 2, the elements are designated with corresponding primed numbers and the control valves 18' are manually operated as necessary in response to the photoelectric cell units. Valves 62 and 64 regulate flow as necessary with respect to vessel 58 and line 60. It will be understood that additional cell units for elution and regeneration, such as those shown in sections C and D of FIG. 1, may readily be added.

EXAMPLE 1

A simulated mine drainage solution containing 0.634 gram per liter of copper and having an adjusted pH of 4.5 is fed into the system of FIG. 3 from vessel 50 at rate of 150 ml. per minute. Ion exchange resin is introduced from vessel 54 and transferred from cell to cell at a rate of 4 cc. per minute. Samples are withdrawn from the aqueous effluent at fifteen-minute intervals and analyzed; the results are as follows:

| Sample No.: | Copper, g./l. | Percent copper extracted | pH |
| --- | --- | --- | --- |
| 1 | 0.121 | | 3.2 |
| 2 | 0.264 | 58 | 3.3 |
| 3 | 0.137 | 79 | 3.3 |
| 4 | 0.149 | 77 | 3.4 |

At the conclusion of the run, the liquid phase from the settling chamber 2 of each cell is analyzed and the results are as follows:

| Cell Number) | Copper, g./l. | Accumulative percent copper extracted | pH |
| --- | --- | --- | --- |
| I | 0.506 | 20 | 3.3 |
| II | 0.458 | 28 | 3.1 |
| III | 0.378 | 40 | 3.1 |
| IV | 0.253 | 60 | 2.9 |
| V | 0.112 | 82 | 3.1 |

EXAMPLE 2

A solution containing 0.678 gram per liter of copper and having an adjusted pH of 4.5 is fed into the system of FIG. 3 at a rate of 150 ml. per minute. A 1% sodium carbonate solution is intermittently added to the copper solution being introduced. The resin is added and transferred at a rate of 4 cc. per minute. Samples of effluent are withdrawn every fifteen minutes and analyzed; at the same time, the pH of the liquids in settling chambers I and V is measured. The results are as follows:

| Sample No.: | Copper, g. l. | Percent copper extracted | pH Cell I | pH Cell V |
| --- | --- | --- | --- | --- |
| 1 | 0.118 | | 5.1 | 3.4 |
| 2 | 0.231 | 66 | 4.5 | 3.5 |
| 3 | 0.152 | 78 | 5.2 | 3.6 |
| 4 | 0.152 | 78 | 5.2 | 3.6 |
| 5 | 0.191 | 72 | 5.2 | 3.6 |
| 6 | 0.162 | 76 | 4.5 | 3.6 |

EXAMPLE 3

A solution with a copper content of 0.634 gram per liter and an adjusted pH of 4.5 is fed to the system at the rate of 130 ml. per minute, together with a 1% sodium carbonate solution. The resin addition and transferral rate is 5 cc. per minute. Samples are withdrawn and analyzed as in Example 2, with the following results:

| Sample No.: | Copper, g. l. | Percent copper extracted | pH Cell I | Cell V |
|---|---|---|---|---|
| 1 | 0.097 | 0 | 4.6 | 3.5 |
| 2 | 0.035 | 95 | 5.1 | 3.7 |
| 3 | 0.051 | 92 | 4.3 | 3.7 |
| 4 | 0.116 | 82 | 4.1 | 3.5 |
| 5 | 0.034 | 95 | 4.9 | 3.7 |
| 6 | 0.028 | 96 | 5.2 | 3.7 |
| 7 | 0.086 | 87 | 4.3 | 3.6 |
| 8 | 0.044 | 93 | 5.5 | 3.6 |

Figure 4:
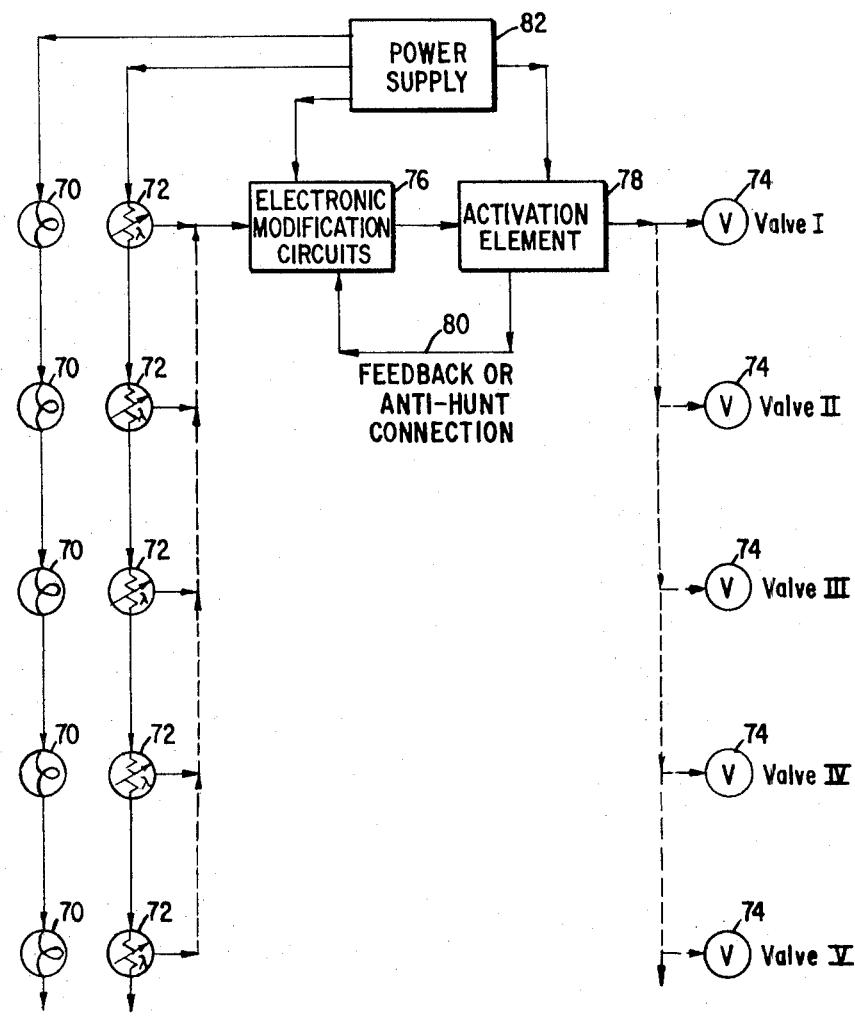
FIG. 4 is a schematic diagram illustrating an electrical control circuit for an automatically controlled system of the invention.

Reference is now made to FIG. 4 wherein there is indicated schematically the essential features of an automatically controlled solid-liquid countercurrent flow system embodying the invention. As there shown, the three items essential to automatic control are a plurality of photoconductive cells 72, each typically a Clairex Cell No. CL 602 hereinbefore described, and in cooperation therewith light sources 70, typically 6 volt DC lamps. It will be appreciated that in use the photoconductive cells 72 and light sources 70 are disposed on opposite sides of transparent bypass conduits, e.g., conduits 14a in FIG. 2, or otherwise oppositely disposed within or through the walls of such a conduit, e.g., if not transparent, the control valves 74. Thus it will be appreciated that each of the cell-light source combinations serves to monitor solids flow in a corresponding bypass conduit. The other components usually embodied in automatic flow control systems are provided, i.e., electronic modification circuits 76, activation element 78, "anti-hunt" or feedback connection means 80 and a power supply 82. The electronic modification circuit 76 is an electronic device which receives changes from the photoconductive cells and produces certain output characteristics with relation to the energy delivered by the photoconductive cells. The output energy from the modification circuit is received by the activation element 78, typically a motor, a solenoid or other electromechanical device which produces the change required to correct the device or process to be regulated, i.e., by changing the individual valve settings as necessary. The feedback or anti-hunt correction 80 is or may be present to prevent the electronic controller from over shooting the desired regulation point. The power supply 82 provides electrical power to light source, photoconductive cell circuits and other components requiring electrical energy.

In FIG. 4 switches have been omitted since the sequence of operation is a matter of choice, that is, mixer-settler stages can be individually monitored and corrected at all times or, if desired, the automatic controller can be programmed to scan in cycles of any desired time unit from stage to stage. In general, the sequence of operating events may be described as follows: as resistance changes in the photoconductive cell circuit, due to a variation in the quantity of solids passing between the light source and photoconductive cell, the change in electrical energy is noted in the electronic modification circuit, which changes are proportionally transferred to the activation element thus providing the necessary correction in fluid bypass valve setting.

Figure 5:
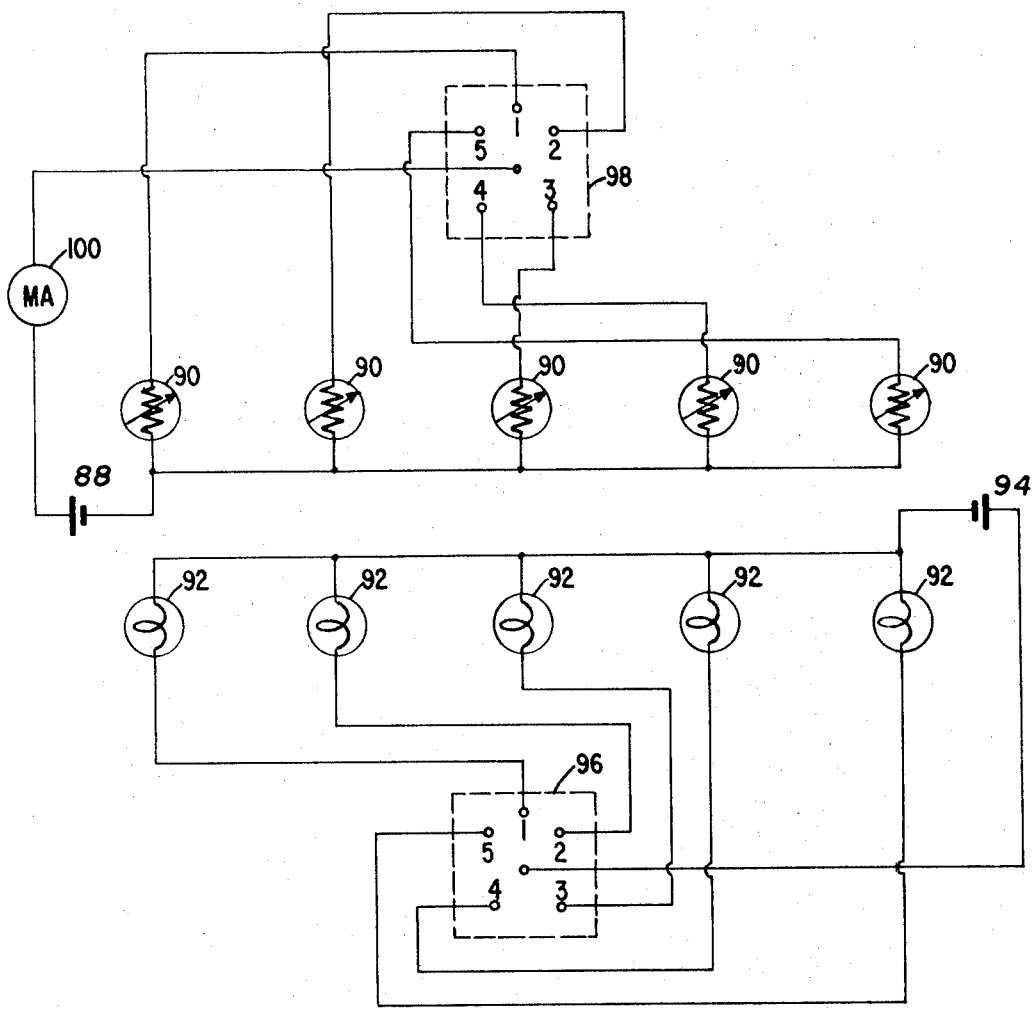
FIG. 5 is a schematic diagram illustrating an electrical circuit for monitoring flow in the system of the invention.

Reference is now made to FIG. 5 wherein there is schematically illustrated a control circuit permitting individual control of flow rates with continuous monitoring of flow. As there shown, a plurality of photoconductive cells 90 and light sources 92 are appropriately positioned about glass bypass conduits, e.g., as shown at 21 in FIG. 2. In the light circuit, the sources 92 are connected to a power supply, typically comprising a 6 volt battery 94, and a multiple (5 position) ganged switch 96; in the corresponding circuit for the photoconductive cells 90, a corresponding power supply, i.e., 6 volt battery 88, and corresponding ganged switch connections 98. In addition there is provided a milliammeter 100. In operation, by turning the ganged switches to position 1, the flow through the monitored bypass conduit can be reflected via a reading of the milliammeter. Similarly, turning to positions 2, 3, 4 and 5, in turn, permits obtaining a corresponding milliammeter reading for each position. Thus it is possible to adjust manually, or otherwise, the corresponding control valves for each bypass conduit.

Although the invention has been described with particular reference to specific embodiments thereof, it is not to be so limited, since changes and modifications therein may be made which are within the full intended scope of the invention as defined in the appended claims.

What is claimed is:
1. In a method for continuously and countercurrently contacting liquids with solids in a series of mixing-settling cells including a first, last and intermediate cells which comprises:
  (A) mixing and allowing to settle said solids and liquid in the cells;
  (B) withdrawing the treated liquid from each of the first and intermediate cells through a discharge conduit into the next succeeding cell;
  (C) withdrawing the further-treated liquid from the last cell through a conduit into a receiving vessel;
  (D) withdrawing the solids used to treat the liquid in each of said cells through a discharge conduit into a by-pass conduit;
  (E) maintaining solids flow in said by-pass conduits by means of a flowing liquid;
  (F) regulating said flow of liquid in each of said by-pass conduits proportional to the amount of solids in said by-pass conduit;
  (G) causing, by means of a forced current of air, the liquid-solid mixture in the by-pass conduit in the last and intermediate cells to the conveyed to the next preceding mixing-settling cell in the series;
  (H) introducing a liquid to the first cell in the series,
  (I) removing the liquid-solid mixture in the by-pass conduit of the first cell of the series from the system, the liquid maintaining the flow in said by-pass conduit of the first cell being from a source external of the series of cells;
  (J) introducing into the last cell in the series with respect to liquid flow fresh solids;
the liquid used to maintain the flow in the by-pass conduit of each cell, other than the first cell, is a portion of the liquid withdrawn from the next preceding cell in the series and the amount of said liquid flowing through said by-pass is that amount required to maintain a hydraulic balance within said by-pass conduits such that substantially only resin is discharged into said by-pass conduits from said discharge conduits.
2. In a method for continuously and countercurrently contacting liquids with solids in a series of mixing-settling cells including a first, last and intermediate cells which comprises:
  (A) mixing and allowing to settle said solids and liquid in the cells;
  (B) withdrawing the treated liquid from each of the first and intermediate cells through a discharge conduit into the next succeeding cell;
  (C) withdrawing the further-treated liquid from the last cell through a conduit into a receiving vessel;
  (D) withdrawing the solids used to treat the liquid in each of said cells through a discharge conduit into a by-pass conduit;
  (E) maintaining solids flow in said by-pass conduit by means of a flowing liquid;
  (F) regulating said flow of liquid in each of said by-pass conduits proportional to the amount of solids in said by-pass conduit;
  (G) causing, by means of a forced current of air, the liquid-solid mixture in the by-pass conduit in the last and intermediate cells to be conveyed to the next preceding mixing-settling cell in the series and in the first cell to be conveyed to the last cell; and, (H) introducing a liquid to the first cell in the series; the improvements wherein:

(1) the liquid used to maintain the flow of solids in the by-pass conduit of each cell in the series, other than the first, is a portion of the liquid withdrawn from the next preceding cell in the series to which the solids in said by-pass conduit are being conveyed;

(2) the liquid used to maintain the flow in the by-pass conduit of the first cell in the series is a portion of the liquid withdrawn from the last cell in the series;

(3) the amount of said liquids flowing through said by-passes is that amount required to maintain a hydraulic balance within said by-pass conduits such that substantially only solids is discharged into said by-pass conduits.

(4) the solid introduced into the last cell of the series is provided by the liquid-solid mixture conveyed from the by-pass conduit of the first cell in the series.

3. In a method for the continuous contacting, washing, eluting, and regenerating of a solid, particulate ion-exchange resin with a series of liquids in four mixing-settling stages which method comprises:

(A) in a first, with respect to resin flow, mixing-settling stage;
(1) mixing and allowing to settle a contacting liquid and a regenerated ion exchange resin, whereby an ion-exchange reaction takes place between said liquid and said resin,
(2) withdrawing the thus-treated contacting liquid from the first mixing-settling stage through a conduit into a receiving vessel,
(3) withdrawing the used solid ion-exchange resin through a conduit into a by-pass conduit,
(4) maintaining the flow of resin in said by-pass conduit by means of flow of a liquid,
(5) regulating the flow of liquid in said by-pass conduit proportional to the amount of resin in said by-pass conduit and
(6) causing, by means of a forced current of air the liquid-resin mixture in the by-pass conduit to be conveyed to a second mixing-settling stage, (B) in a second mixing-settling stage;
(1) mixing and allowing to settle a washing liquid and the used resin from the first stage, whereby any remaining contacting liquid conveyed from the first stage is washed from the resin,
(2) withdrawing the used washing liquid from said second stage to a receiving vessel,
(3) withdrawing the washed resin through a conduit into a by-pass conduit,
(4) maintaining the flow of resin in said by-pass conduit by means of a flow of liquid, and regulating the flow of liquid in said by-pass conduit proportional to the amount of resin in said by-pass conduit,
(5) causing, by means of a forced current of air, the liquid-resin mixture in said by-pass conduit to be conveyed to a third mixing-settling stage, (C) in a third mixing-settling stage;
(1) mixing and allowing to settle an eluting liquid and the washed ion-exchange resin from the second stage, whereby the values exchanged from the contacting liquid in the first stage are released from the resin,
(2) withdrawing the liquid containing the eluted values from said third stage to a receiving vessel,
(3) withdrawing the eluted resin through a conduit into a by-pass conduit,
(4) maintaining the flow of resin in said by-pass conduit by means of a flow of liquid, and regulating the flow of liquid in said by-pass conduit proportional to the amount of resin in said by-pass conduit,
(5) causing, by means of a forced current of air, the liquid-resin mixture in said by-pass conduit to be conveyed to a fourth mixing-settling stage and (D) in a fourth mixing-settling stage;
(1) mixing and allowing to settle a regenerating liquid and the eluted resin from the third stage, whereby the resin is regenerated,
(2) withdrawing the used regenerating liquid from the fourth stage to a receiving vessel,
(3) withdrawing the regenerated resin through a conduit into a by-pass conduit,
(4) maintaining the flow of resin in said by-pass conduit by means of a flow of liquid, and regulating the flow of liquid in said by-pass conduit proportional to the amount of resin in said by-pass conduit,
(5) causing, by means of a forced current of air, the liquid-resin mixture in said by-pass conduit to be conveyed to the original first stage;

the improvement wherein the liquid maintaining the flow in each respective by-pass conduit is a portion of that liquid withdrawn from the next mixing-settling stage in the series to which the discharged resin is being conveyed, and the amount of liquid flowing through each by-pass is the amount required to maintain a hydraulic balance within said by-pass such that substantially only resin is discharged into said by-pass, thereby maintaining inter-stage liquid contamination at a minimum.

4. A method as in claim 3 wherein at least one of the four mixing-settling stages includes more than one mixing-settling cell within said stage.

References Cited

UNITED STATES PATENTS

| | | | |
|---|---|---|---|
| 1,792,003 | 2/1931 | Dickey | 23—271X |
| 2,066,934 | 1/1937 | Gulliksen | 23—267X |
| 2,076,126 | 4/1937 | Guinot | 23—271X |
| 2,120,003 | 6/1938 | Schary | 23—271X |
| 2,543,522 | 2/1951 | Cohen | 23—267X |
| 2,572,082 | 10/1951 | Welsh | 210—33 |
| 2,973,319 | 2/1961 | Porter | 210—33 |
| 3,084,120 | 4/1963 | Cecil | 210—33 |
| 3,130,151 | 4/1964 | Levendusky | 210—33 |
| 3,189,533 | 6/1965 | Anscherlik | 23—267X |
| 3,432,429 | 3/1969 | Mihara | 210—33 |

NORMAN YUDKOFF, Primary Examiner

S. J. EMERY, Assistant Examiner

U.S. Cl. X.R.

23—270, 271, 312; 210—33, 189